(12) United States Patent
Chapman et al.

(10) Patent No.: US 10,447,848 B2
(45) Date of Patent: *Oct. 15, 2019

(54) SYSTEM AND METHOD FOR RELIABLE CALL RECORDING TESTING AND PROPRIETARY CUSTOMER INFORMATION RETRIEVAL

(71) Applicant: Cyara Solutions Pty Ltd, Hawthorn, VIC (AU)

(72) Inventors: Brian Chapman, Concord (AU); Geoff Willshire, Yeronga (AU)

(73) Assignee: Cyara Solutions Pty Ltd, Hawthorn (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/468,104

(22) Filed: Mar. 23, 2017

(65) Prior Publication Data

US 2017/0257482 A1 Sep. 7, 2017

Related U.S. Application Data

(63) Continuation-in-part of application No. 14/848,849, filed on Sep. 9, 2015.

(Continued)

(51) Int. Cl.
*H04M 3/28* (2006.01)
*H04M 3/42* (2006.01)
(Continued)

(52) U.S. Cl.
CPC ............ *H04M 3/28* (2013.01); *G06F 16/683* (2019.01); *H04M 3/323* (2013.01);
(Continued)

(58) Field of Classification Search
CPC ....... G10L 19/018; G10L 25/18; G10L 25/51; G10L 13/04; H04M 3/4936; H04M 3/28;
(Continued)

(56) References Cited

U.S. PATENT DOCUMENTS 7,224,776 B2 * 5/2007 Creamer ............... H04M 3/493
379/1.02
8,761,373 B1 * 6/2014 Raghavan ........... H04M 3/4936
379/111

(Continued)

FOREIGN PATENT DOCUMENTS

WO 1998013988 A1 4/1998

*Primary Examiner* — Lisa Hashem
(74) *Attorney, Agent, or Firm* — Brian R. Galvin; Galvin Patent Law, LLC

(57) ABSTRACT

A system and methods for reliable call recording testing and proprietary customer information retrieval, wherein recording may be both active and passive in nature, recording call audio from the moment a call begins such as to include dial tones, IVR interactions, and other non-conversation call contents that may generally be omitted in traditional recordings. These recordings may then be compared to similar recordings collected by traditional systems to "align" the recordings, identifying portions of the call that may have been omitted from one recording by using audio fingerprinting to match recordings up for improved analysis.

3 Claims, 18 Drawing Sheets

Related U.S. Application Data

(60) Provisional application No. 62/048,108, filed on Sep. 9, 2014.

(51) Int. Cl.
    *G06F 16/683*     (2019.01)
    *H04M 3/32*       (2006.01)
    *H04M 3/51*       (2006.01)
    *G10L 25/18*      (2013.01)
    *G10L 25/51*      (2013.01)
    *G10L 13/04*      (2013.01)

(52) U.S. Cl.
    CPC ......... *H04M 3/42221* (2013.01); *G10L 13/04* (2013.01); *G10L 25/18* (2013.01); *G10L 25/51* (2013.01); *H04M 3/5175* (2013.01); *H04M 2201/41* (2013.01); *H04M 2203/301* (2013.01); *H04M 2203/303* (2013.01); *H04M 2203/558* (2013.01)

(58) Field of Classification Search
    CPC ............. H04M 3/42221; H04M 3/323; H04M 3/5175; H04M 2203/301; H04M 2203/558; H04M 2203/303; H04M 2201/41; G06F 16/683
    See application file for complete search history.

(56) References Cited

U.S. PATENT DOCUMENTS

| | | | |
|---|---|---|---|
| 8,762,154 B1* | 6/2014 | Witt-ehsani | G10L 25/48 379/88.01 |
| 9,179,000 B2 | 11/2015 | Kolodizner et al. | |
| 9,237,232 B1* | 1/2016 | Williams | H04M 3/4936 |
| 9,420,091 B2 | 8/2016 | Shaffer | |
| 9,667,776 B1* | 5/2017 | Dux | H04M 3/30 |
| 9,819,792 B2* | 11/2017 | Zilles | H04M 3/242 |
| 10,034,174 B1* | 7/2018 | Tuomikoski | H04W 12/08 |
| 2002/0006186 A1* | 1/2002 | Sanders | H04M 1/24 379/1.01 |
| 2002/0145979 A1* | 10/2002 | Baj | H04L 43/50 370/242 |
| 2002/0167936 A1* | 11/2002 | Goodman | H04L 41/5003 370/352 |
| 2002/0167937 A1* | 11/2002 | Goodman | G10L 25/69 370/352 |
| 2003/0204404 A1* | 10/2003 | Weldon | H04M 3/493 704/270.1 |
| 2004/0008825 A1* | 1/2004 | Seeley | H04M 3/22 379/32.01 |
| 2008/0080531 A1 | 4/2008 | Williams et al. | |
| 2008/0146216 A1* | 6/2008 | Newman | H04L 43/50 455/424 |
| 2009/0041215 A1* | 2/2009 | Schmitt | G06F 9/45512 379/88.17 |
| 2013/0259211 A1* | 10/2013 | Vlack | G06F 17/30743 379/88.01 |
| 2013/0325981 A1* | 12/2013 | Hauke | H04L 51/04 709/206 |
| 2014/0105379 A1* | 4/2014 | Kulkarni | H04M 3/2236 379/265.02 |
| 2014/0270126 A1* | 9/2014 | Torgersrud | H04M 3/38 379/189 |
| 2016/0028881 A1* | 1/2016 | Assem | H04M 3/2227 370/252 |
| 2016/0050317 A1* | 2/2016 | Natesan | H04M 3/4936 379/88.01 |
| 2016/0198045 A1* | 7/2016 | Kulkarni | H04M 3/4938 379/88.01 |
| 2016/0219143 A1* | 7/2016 | Zilles | H04M 3/242 |
| 2016/0227034 A1* | 8/2016 | Kulkarni | H04M 3/493 |
| 2018/0205823 A1* | 7/2018 | Horton | H04M 3/2281 |
| 2019/0007550 A1* | 1/2019 | Kulkarni | H04M 3/5175 |

* cited by examiner

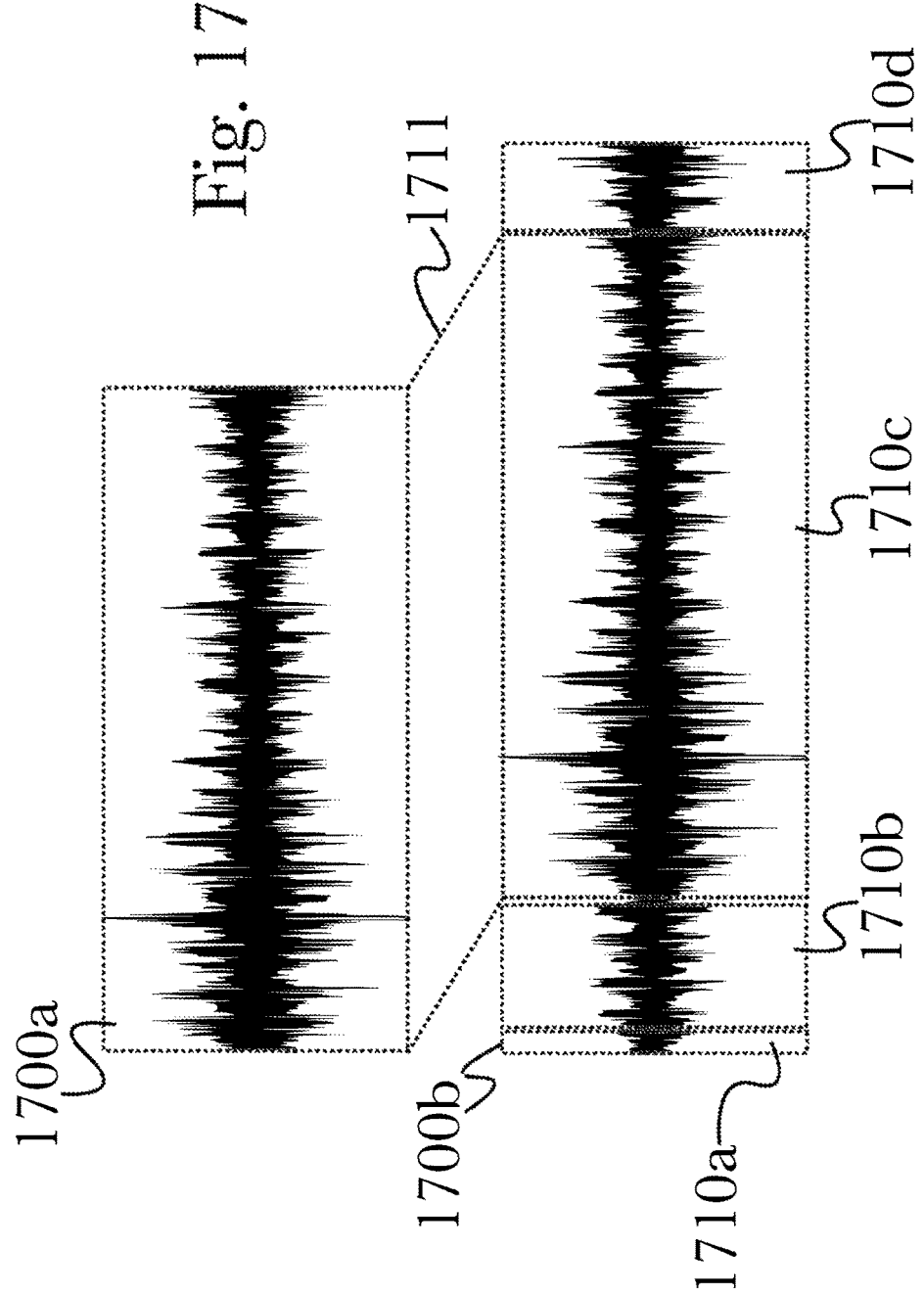

SYSTEM AND METHOD FOR RELIABLE CALL RECORDING TESTING AND PROPRIETARY CUSTOMER INFORMATION RETRIEVAL

CROSS-REFERENCE TO RELATED APPLICATIONS

This application is a continuation of U.S. patent application Ser. No. 14/848,849 titled "CALL RECORDING TEST SUITE", filed on Sep. 9, 2015, which claims priority to U.S. provisional patent application Ser. No. 62/048,108, titled "ICALL RECORDING TEST SUITE", which was filed on Sep. 9, 2014, the entire specifications of each of which are incorporated herein by reference.

BACKGROUND OF THE INVENTION

Field of the Art

The disclosure relates to the field of contact center operations, and more particularly to the field of call recording quality assurance and review for proprietary customer information (PCI) compliance auditing.

Discussion of the State of the Art

FIG. 1 (PRIOR ART) is a typical system architecture diagram of a contact center 100, known to the art. A contact center is similar to a call center, but a contact center has more features. Whilst a call center only communicates by voice, a contact center adds email, text chat, and web interfaces to voice communication in order to facilitate communications between a customer endpoint 110, and a resource endpoint 120, through a network 130, by way of at least one interface, such as a text channel 140 or a multimedia channel 145 which communicates with a plurality of contact center components 150. A contact center 100 is often operated through an extensive open workspace for agents with work stations that may include a desktop computer 125 or laptop 124 for each resource 120, along with a telephone 121 connected to a telecom switch, a mobile smartphone 122, and/or a tablet 123. A contact center enterprise may be independently operated or networked with additional centers, often linked to a corporate computer network 130. Resources are often referred to as agents, but for inside sales, for example, they may be referred to as sales representatives, or in other cases they may be referred to as service representatives, or collection agents, etc. Resource devices 120 may communicate in a plurality of ways, and need not be limited to a sole communication process. Resource devices 120 may be remote or in-house in a contact center, or out-sourced to a third party, or working from home. They handle communications with customers 110 on behalf of an enterprise. Resource devices 120 may communicate by use of any known form of communication known in the art be it by a telephone 121, a mobile smartphone 122, a tablet 123, a laptop 124, or a desktop computer 125, to name a few examples. Similarly, customers 110 may communicate in a plurality of ways, and need not be limited to a sole communication process. Customer devices 110 may communicate by use of any known form of communication known in the art, be it by a telephone 111, a mobile smartphone 112, a tablet 113, a laptop 114, or a desktop computer 115, to name a few examples. Communications by telephone may transpire across different network types, such as public switched telephone networks, PSTN 131, or via an internet network 132 for Voice over Internet Protocol (VoIP) telephony. Similarly, VoIP or web-enabled calls may utilize a Wide Area Network (WAN) 133 or a Large Area Network 134 to terminate on a media server 146. Network types are provided by way of example, only, and should not be assumed to be the only types of networks used for communications. Further, resource devices 120 and customer devices 110 may communicate with each other and with backend services via networks 130. For example, a customer calling on telephone handset 111 would connect through PSTN 131 and terminate on a private branch exchange, PBX 147, which is a type of multimedia channel 145. A video call originating from a tablet 123 would connect through an internet 132, connection and terminate on a media server 146. A customer device such as a smartphone 112 would connect via a WAN 133, and terminate on an interactive voice response, IVR 148, such as in the case of a customer calling a customer support line for a bank or a utility service. Text channels 140, may comprise social media 141, email 142, SMS 143 or as another form of text chat, IM 144, and would communicate with their counterparts, each respectively being social server 159, email server 157, SMS server 160, and IM server 158. Multimedia channels 145 may comprise at least one media server 146, PBX 147, IVR 148, and/or BOTS 149. Text channels 140 and multimedia channels 145 may act as third parties to engage with outside social media services and so a social server 159 inside the contact center will be required to interact with the third party social media 141. In another example, an email server 157 would be owned by the contact center 100 and would be used to communicate with a third party email channel 142. The multimedia channels 145, such as media server 146, PBX 147, IVR 148, and BOTS 149, are typically present in an enterprise's datacenter, but could be hosted in a remote facility or in a cloud facility or in a multifunction service facility. The number of communication possibilities are vast between the number of possible resource devices 120, customer devices 110, networks 130, channels 140/145, and contact center components 150, hence the system diagram on FIG. 1 indicates connections between delineated groups rather than individual connections for clarity.

Continuing on FIG. 1 (PRIOR ART), shown to the right of text channels 140, and multimedia channels 145, are a series of contact center components 150, including servers, databases, and other key modules that may be present in a typical contact center, and may work in a black box environment, and may be used collectively in one location or may be spread over a plurality of locations, or even be cloud-based, and more than one of each component shown may be present in a single location or may be cloud-based or may be in a plurality of locations or premises. Contact center components 150, may comprise a routing server 151, a SIP server 152, an outbound server 153, a state and statistics server (also known and referred to herein as a STAT server) 154, an automated call distribution facility, ACD 155, a computer telephony integration server CTI 156, an email server 157, an IM server 158, a social server 159, a SMS server 160, a routing database 170, a historical database 172, and a campaign database 171. It is possible that other servers and databases may exist within a contact center, but in this example, the referenced components are used. Following on with the example given above, in some conditions where a single medium (such as ordinary telephone calls) is used for interactions that require routing, media server 146 may be more specifically a private branch exchange (PBX) 147, automated call distributor (ACD) 155, or similar media-specific switching system. Generally, when interactions arrive at media server 146, a route request, or a variation of a route request (for example, a SIP invite message), is sent to session initiation protocol SIP server 152, or to an equivalent system such as a computer telephony integration (CTI) server 156. A route request is a data message sent from a media-handling device such as media server 146 to a signaling system such as SIP server 152, the message comprising a request for one or more target destinations to which to send (or route, or deliver) the specific interaction with regard to which the route request was sent. SIP server 152 or its equivalent may, in some cases, carry out any required routing logic itself, or it may forward the route request message to routing server 151. Routing server 151 executes, using statistical data from state and statistics server (STAT server) 154 and (at least optionally) data from routing database 170, a routing script in response to the route request message and sends a response to media server 146 directing it to route the interaction to a specific target resource 120. In another case, routing server 151 uses historical information from a historical database 172, or real time information from campaign database 171, or both, as well as configuration information (generally available from a distributed configuration system, not shown for convenience) and information from routing database 170. STAT server 154 receives event notifications from media server 146 or SIP server 152 (or both) regarding events pertaining to a plurality of specific interactions handled by media server 146 or SIP server 152 (or both), and STAT server 154 computes one or more statistics for use in routing based on the received event notifications. Routing database 170 may of course be comprised of multiple distinct databases, either stored in one database management system or in separate database management systems. Examples of data that may normally be found in routing database 170 may include (but are not limited to): customer relationship management (CRM) data; data pertaining to one or more social networks (including, but not limited to network graphs capturing social relationships within relevant social networks, or media updates made by members of relevant social networks); skills data pertaining to a plurality of resources 120 (which may be human agents, automated software agents, interactive voice response scripts, and so forth); data extracted from third party data sources including cloud-based data sources such as CRM and other data from Salesforce.com, credit data from Experian, consumer data from data.com; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of STAT server 154, routing database 170, campaign database 172, historical database 171, and any associated configuration systems, routing server 151 selects a routing target from among a plurality of available resource devices 120, and routing server 151 then instructs SIP server 152 to route the interaction in question to the selected resource device 120, and SIP server 152 in turn directs media server 146 to establish an appropriate connection between customer devices 110 and target resource device 120. In this case, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that customer devices 110 are generally, but not necessarily, associated with human customers or users. Nevertheless, it should be understood that routing of other work or interaction types is possible, although in any case, is limited to act or change without input from a management team.

In the field of contact center operations, centers are required by law to comply with certain regulations regarding proprietary customer information (PCI). For example, calls into a contact center must be recorded, and these recordings stored such that they may be provided when required, such as by a subpoena or court order. Additionally, even after recording, certain storage handling requirements must be met, as for example, in banking or financial institutions regarding the storage of customer financial information (such as credit card or account numbers) is regulated. When a recording is not found upon request, or is found in a manner not according to contracted specifications, the contact center may be subjected to a fine or other penalties.

Metadata may be used in the art to "tag" calls within a recording to make retrieval easier. For example, an agent might mark a call as "important", indicating that it needs to be retained in a specific manner or for a specific length of time (such as for calls dealing with legal matters). Metadata may be used to identify other features or attributes of a call such as a topic, participant information, time-based information, or other such details that might be considered relevant for storage or retrieval of a call recording.

A problem exists when a customer (such as an individual or a corporate entity) attempts to retrieve call recordings and they cannot be found. This may be due to inadequate metadata association, poor recording compliance, or any number of technical or personnel issues that could affect the integrity of the call recording process or the recordings themselves. Systems often are not fully load-tested to ensure reliable function, and as new versions of recording software are deployed, previously unseen issues may be introduced with them that prevent successful call recording or storage. Without a comprehensive system to test a contact center's phone system, specifically for proper call recording and storage under multiple operational conditions under circumstances such as new software deployment, among others, failure discovery may not occur until significant call data has already been lost.

What is needed to answer the need for reliable call recording and retrieval, is a system and method for testing call recording and ensuring PCI compliance which may be used to verify call recordings as well as test a recording system either prior to full deployment in a production setting, or in place (that is, after deployment) as needed. Further, what is needed is a system and method which may be used to test a recording system under a full range of expected system load levels as well as physical and logical configuration options (either prior to full deployment or in place in a production setting as dictated by call system changes), either as part of system troubleshooting or as part of routine system maintenance.

SUMMARY OF THE INVENTION

Accordingly, the inventor has conceived and reduced to practice, in a preferred embodiment of the invention, a set of call recording test tools may be combined to form desired test suites for reliable call recording and PCI compliance which may be used to test call recording systems either existing in-place or prior to deployment, and which may be used without impacting live performance of an existing deployed system. The following non-limiting summary of the invention is provided for clarity, and should be construed consistently with embodiments described in the detailed description below.

The invention provides a means to test contact center audio without the restrictions imposed by traditional call recording systems. Traditional systems record passively, storing call audio for later review and to provide simple tracking of the presence of a recording. According to the embodiments disclosed herein, recording may be both active and passive in nature, recording call audio from the moment a call begins such as to include dial tones, IVR interactions, and other non-conversation call contents that may generally be omitted in traditional recordings. These recordings may then be compared to similar recordings collected by traditional systems to "align" the recordings, identifying portions of the call that may have been omitted from one recording by using audio fingerprinting to match recordings up for improved analysis.

According to a preferred embodiment of the invention, a call recording test engine, comprising: a test database configured to store and provide testing information, the testing information comprising at least a test configuration; a synthetic call generator configured to produce test voice calls into a contact center, the test voice calls being based at least in part on the test information and comprising at least audio-based voice interaction; and a test manager configured to retrieve testing information from the test database, direct the operation of the synthetic call generator, record the test voice call, connect to a call recording system operated by a contact center, retrieve a recording from the call recording system, and analyze the retrieved recording based at least in part on the testing information, the analysis comprising at least a comparison between the recorded test voice call and the retrieved call recording, is disclosed.

According to another preferred embodiment of the invention, a method for reliable call recording testing and proprietary customer information retrieval, comprising the steps of: connecting, using a test manager configured to retrieve testing information from the test database, connect to a call recording system operated by a contact center, retrieve a recording from the call recording system, and analyze the retrieved recording based at least in part on the testing information, to a call recording system operated by a contact center; placing, using a synthetic call generator configured to produce test voice calls into a contact center, the test voice calls being based at least in part on the test information, a test voice call; producing an enhanced recording based at least in part on the test voice call; retrieving a recording from the contact center call recording system; and comparing the enhanced recording against the retrieved recording, is disclosed.

The inventor has conceived, and reduced to practice, in a preferred embodiment of the invention, a call recording test engine for reliable call recording and PCI compliance which may be used to test call recording systems either existing in-place or prior to deployment, and which may be used without impacting live performance of an existing deployed system.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 17 is an illustration of two call recording audio waveforms, illustrating recording comparison and matching using audio fingerprinting to align two recordings and identify call segments within a recording.

DETAILED DESCRIPTION

Figure 1:
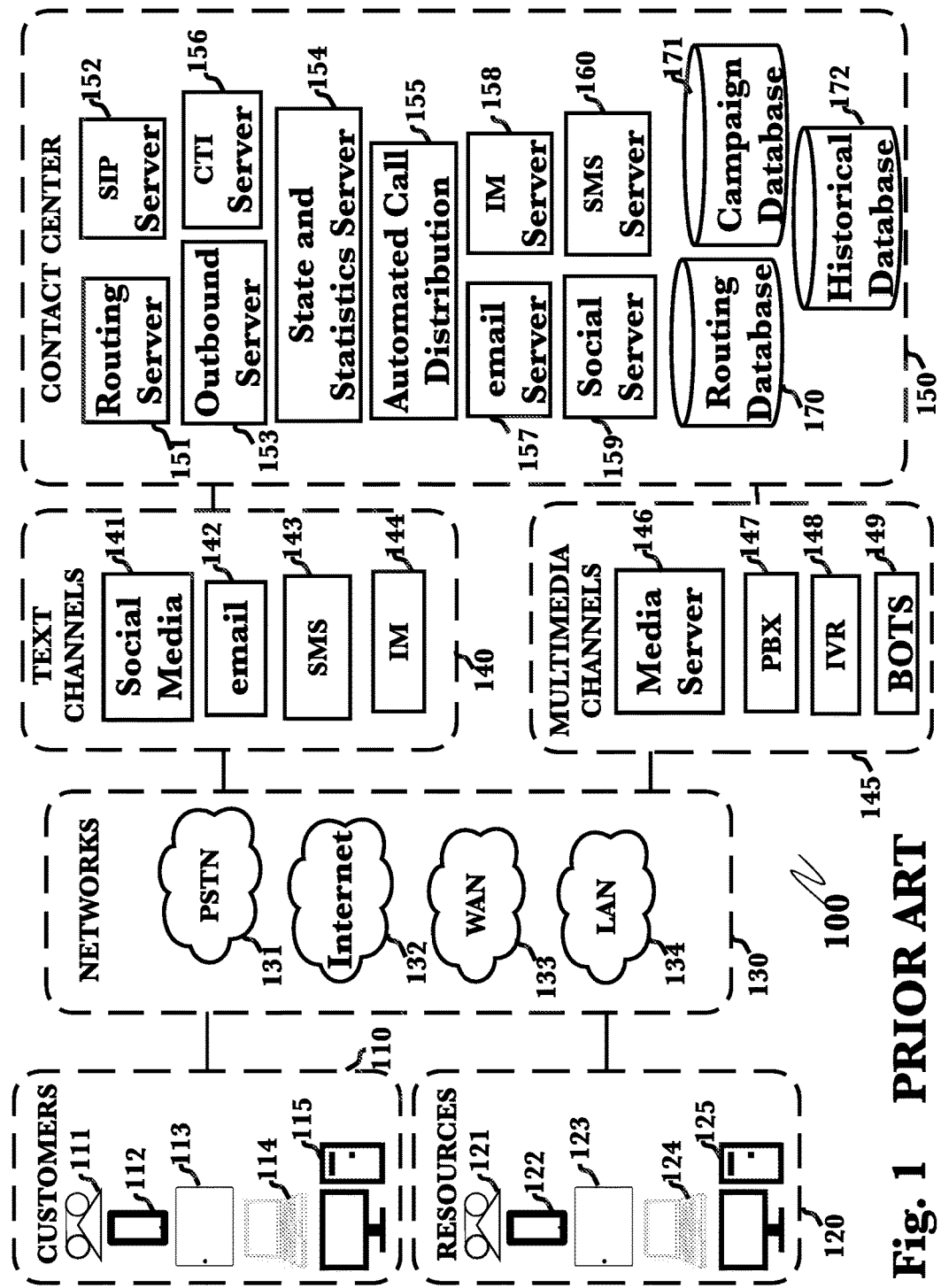
FIG. 1 (PRIOR ART) is a typical system architecture diagram of a contact center including components commonly known in the art.

The inventor has conceived, and reduced to practice, in a preferred embodiment of the invention, a call recording test engine for reliable call recording and PCI compliance which may be used to test voice call recording systems either existing in-place or prior to deployment, and which may be used without impacting live performance of an existing deployed system.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

Figure 2:
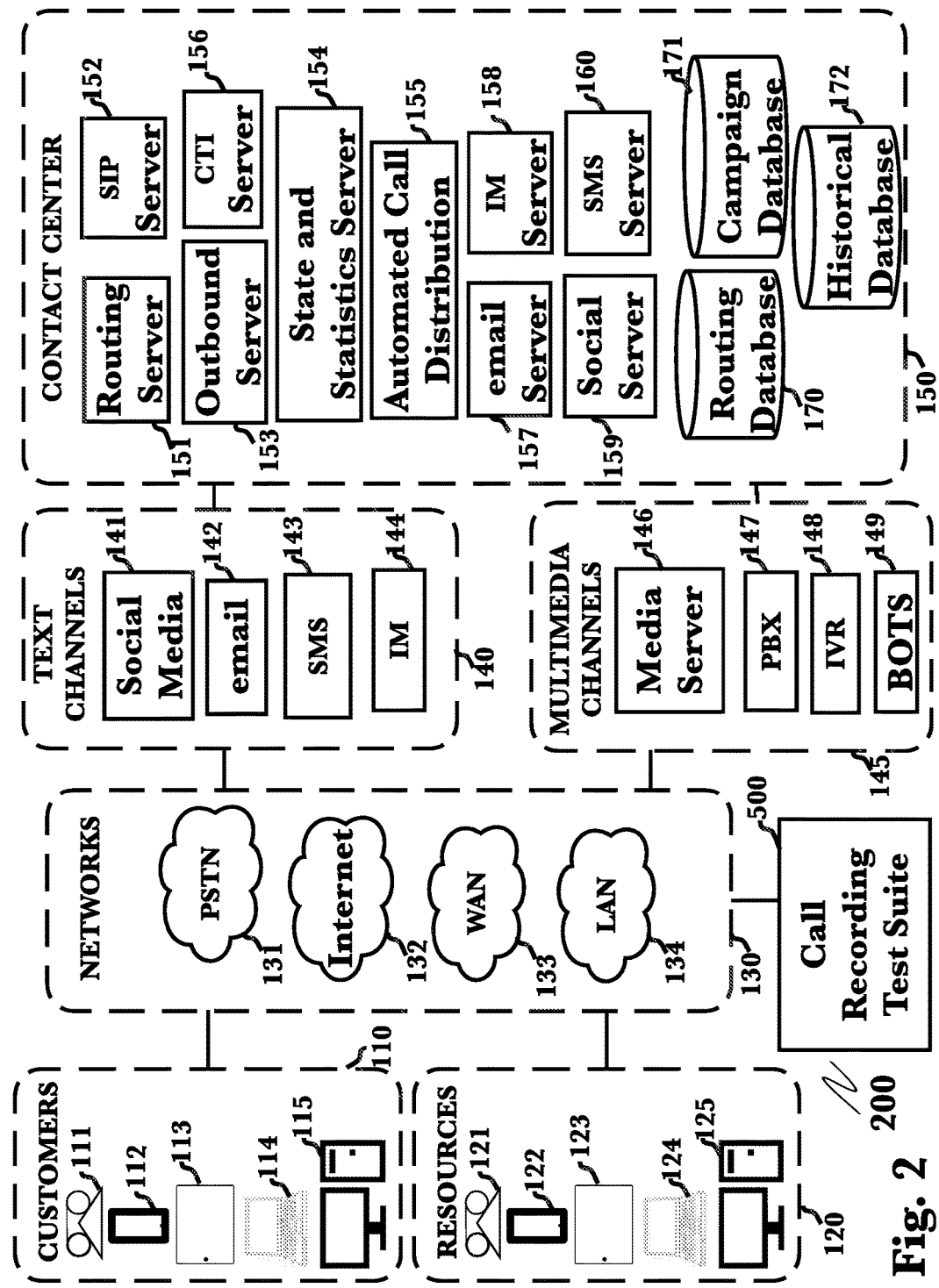
FIG. 2 is a block diagram illustrating an exemplary system architecture for a call recording test engine, according to a preferred embodiment of the invention.

FIG. 2 is a block diagram illustrating an exemplary system architecture 200 for a call recording test engine, according to a preferred embodiment of the invention. According to the embodiment, system 200 may comprise a call recording test engine 500 operating on a network 130, such as to connect with various call recording systems known in the art that may be operated by network-connected client systems (such as a contact center 520), as illustrated. A plurality of customers 110 and network-connected resources 120 may connect to a contact center 150 via a network 130 using a variety of specific communication means such as including (but not limited to) text-based communication channels 140 such as social media networks 141, email messages 142, SMS messaging 143 or IP-based instant messaging 144, or via multimedia communication channels 145 such as via a media server 146, a private branch exchange (PBX) 147, an interactive voice response (IVR) system 148, or via communication bots 149 that may automate or simulate communication (as may be used for testing purposes without relying on actual customer communication). Communication may occur over a variety of network types 130, such as (again, including but not limited to) a public switched telephone network (PSTN) 131, the Internet 132 or other wide-area network (WAN) 133, or a local-area network (LAN) 134, according to various arrangements. For example, internal testing may occur exclusively within a LAN, while testing of online helpdesk interactions may use Internet-connected IM or email, or other arrangements.

A contact center may comprise a number of systems and features common in the art, such as for example a routing server 151 that directs other components based on routing instructions from a routing database 170 to route interactions to appropriate handling endpoints (such as agents to answer calls or IMs), a stack interchange protocol (SIP) server 152 that handles SIP-based telephony, an outbound server 153 that processes outbound interaction attempts such as customer callbacks, state and statistics server 154 that manages internal contact center state monitoring and statistics (for example, tracking interaction metrics such as handle time, queue wait time, number of interactions handled or transferred, and other various metrics that are commonly tracked in contact center operations), or an automated call distributor (ACD) that may be used to automatically distribute interactions to endpoints, (for example based on customer input or agent skills). Additionally, a variety of interaction servers may be used to appropriately receive, process, and handle interactions such as a computer-telephony integration (CTI) server 156 that may be used to connect telephony and computer-based or IP technologies, email server 157 that may be used to handle email-based interactions, IM server 158 that may be used to handle web-based instant messaging, social server 159 that may be used to handle content from social media networks (such as communicating directly with a social network's public API, for example to read and process content and user messages), or SMS server 160 that may be used to handle SMS-based text messages. Additionally, contact center campaign information (for example, metric goals pertaining to a particular customer or campaign) may be stored in a campaign database 171 for reference, and historical interaction information may be stored in an historical database 172 such as to store call recording for later reference or analysis. According to such an arrangement, call recording test engine 500 may be able to monitor interactions starting before they even reach a contact center 150, enabling more accurate recording of entire interactions from the moment a customer initiates them.

Figure 3:
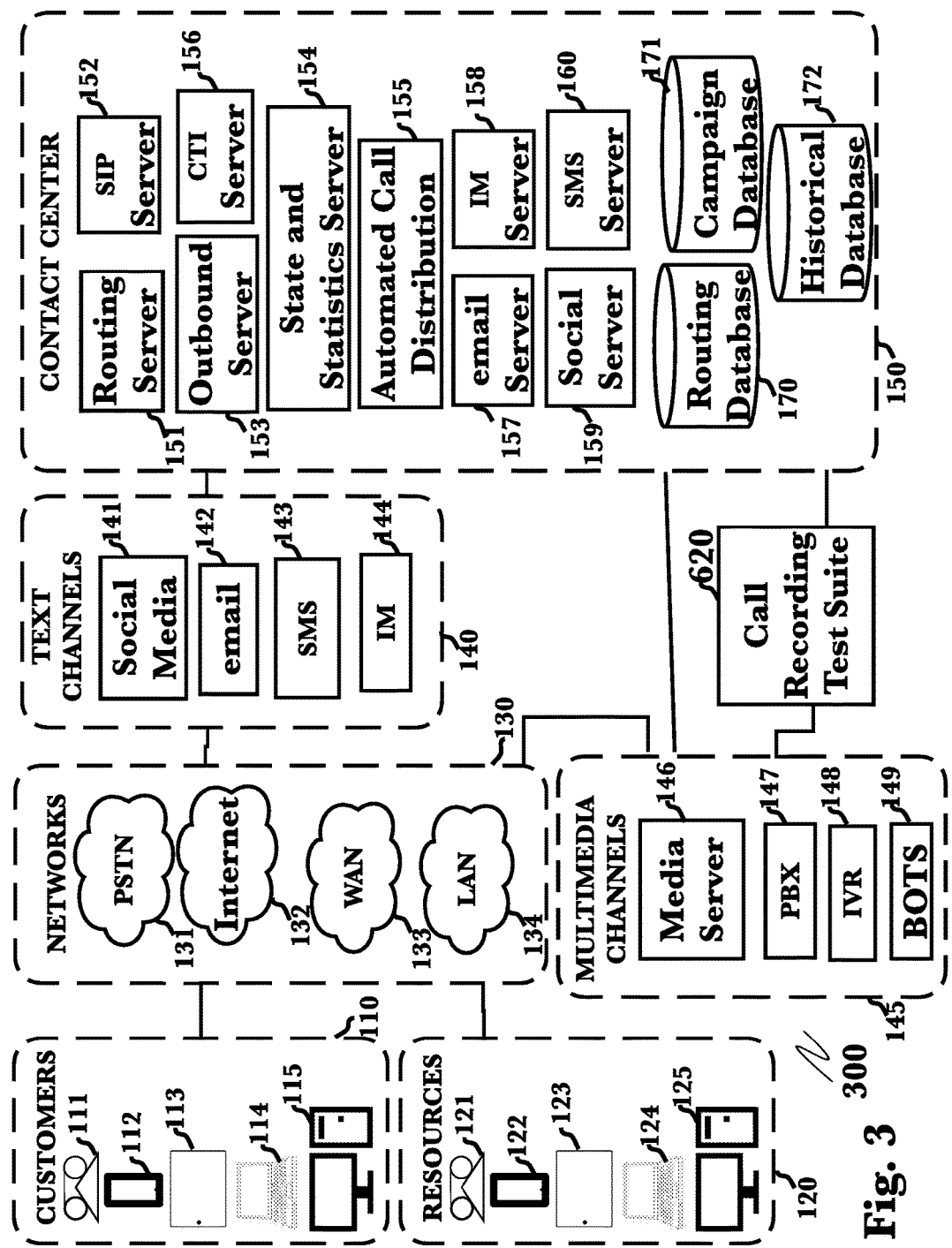
FIG. 3 is a block diagram illustrating an exemplary alternate system architecture for a call recording test engine, according to another preferred embodiment of the invention.

FIG. 3 is a block diagram illustrating an exemplary alternate system architecture 300 for a call recording test engine, according to another preferred embodiment of the invention. According to the arrangement shown, a call recording test engine 620 may operate with a direct connection to a contact center 150, for example for better integration with contact center systems as described below. This may be used to enable tracking not only of interaction recordings but also advanced testing of recordings by comparing recorded results against measured performance and other factors as monitored within the contact center systems themselves. Another testing method involves comparison of recordings collected by the test engine 620 against existing or new recordings collected by other systems such as previous call recording technologies or current recording systems being used in parallel within a contact center 150. This may be used to compare the contents of recordings and more closely examine their accuracy or usefulness, as described below with reference to FIG. 17.

As described above, referring to FIG. 2, a contact center may comprise a number of systems and features common in the art, such as for example a routing server 151 that directs other components based on routing instructions from a routing database 170 to route interactions to appropriate handling endpoints (such as agents to answer calls or IMs), a stack interchange protocol (SIP) server 152 that handles SIP-based telephony, an outbound server 153 that processes outbound interaction attempts such as customer callbacks, state and statistics server 154 that manages internal contact center state monitoring and statistics (for example, tracking interaction metrics such as handle time, queue wait time, number of interactions handled or transferred, and other various metrics that are commonly tracked in contact center operations), or an automated call distributor (ACD) that may be used to automatically distribute interactions to endpoints, (for example based on customer input or agent skills). Additionally, a variety of interaction servers may be used to appropriately receive, process, and handle interactions such as a computer-telephony integration (CTI) server 156 that may be used to connect telephony and computer-based or IP technologies, email server 157 that may be used to handle email-based interactions, IM server 158 that may be used to handle web-based instant messaging, social server 159 that may be used to handle content from social media networks (such as communicating directly with a social network's public API, for example to read and process content and user messages), or SMS server 160 that may be used to handle SMS-based text messages. Additionally, contact center campaign information (for example, metric goals pertaining to a particular customer or campaign) may be stored in a campaign database 171 for reference, and historical interaction information may be stored in an historical database 172 such as to store call recording for later reference or analysis. According to such an arrangement, call recording test engine 500 may be able to monitor interactions starting before they even reach a contact center 150, enabling more accurate recording of entire interactions from the moment a customer initiates them.

Figure 4:
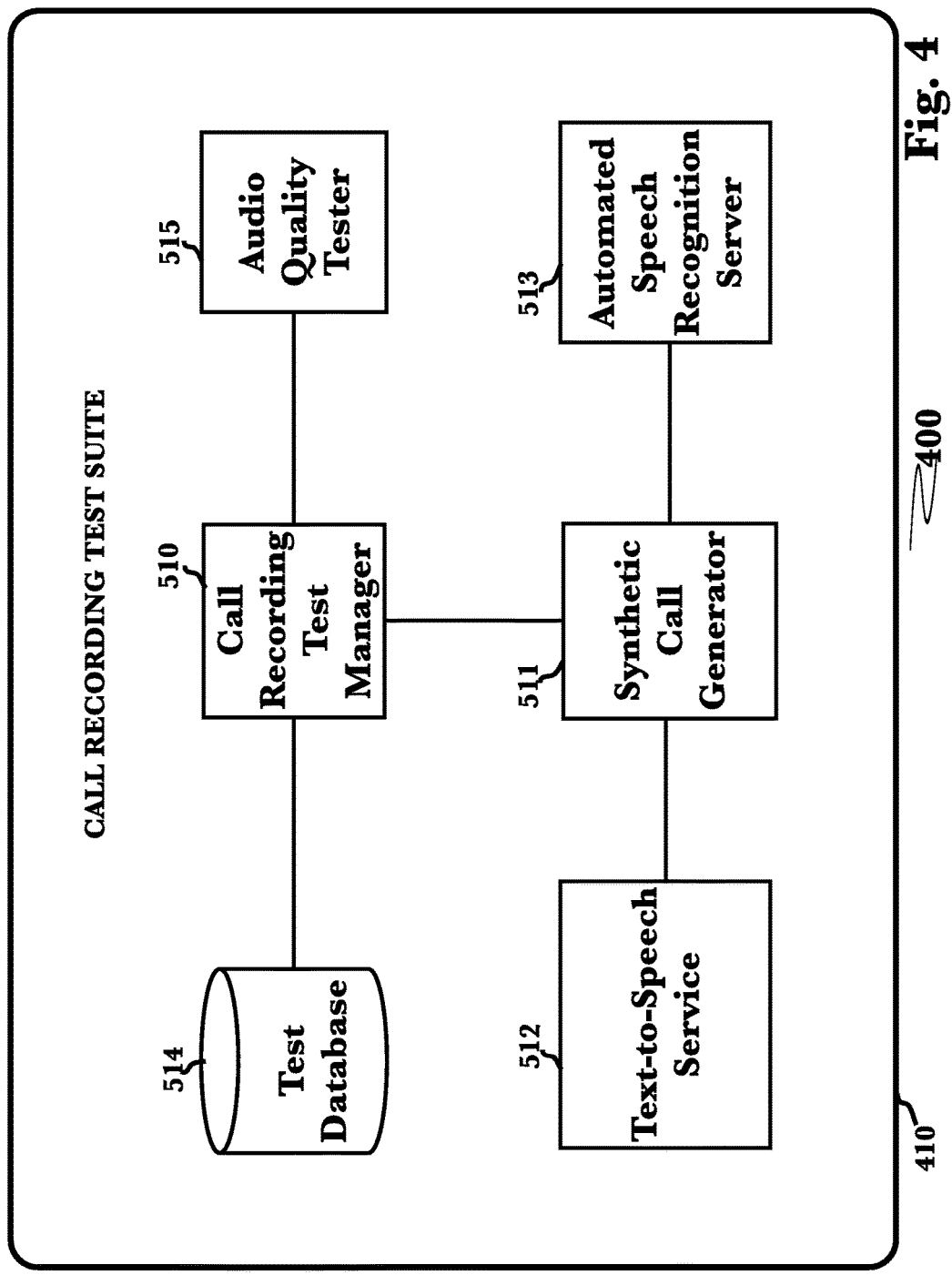
FIG. 4 is a block diagram illustrating an expanded view of an exemplary system architecture for a call recording test engine, according to another preferred embodiment of the invention.

FIG. 4 is a block diagram illustrating an expanded view of an exemplary system architecture 400 for a call recording test engine 410, according to another preferred embodiment of the invention. According to the embodiment, a call recording test engine 410 may comprise a call recording test manager 510, the runs and directs recording testing operations. Specific test information such as parameters and configuration data may be stored in, and retrieved from, a test database 514. Test database 514 may also be used to store and provide recordings, for example to store recorded interactions in an encrypted state (to protect information and prevent tampering) and providing them as needed for analysis or comparison. An audio quality tester 515 may be used to test the quality of recorded audio in an interaction, such as background noise or distortion, or gaps in audio that may indicate an issue with call reception, or issues that may indicate a problem with the recording file or the recording system. A synthetic call generator 511 may be used to produce synthetic calls for testing purposes, so that tests may operate without requiring or interfering with actual customer communications (for example, so that specific features or interaction types or qualities may be tested, or so that tests may be run in a non-production environment such as to trial new testing configurations or changes to contact center systems prior to deployment). Synthetic calls may also utilize a text-to-speech service 512 such as to parse text-based scripts for use as voice interaction (for example, so that a synthetic call may submit vocal interaction responses to a contact center's IVR system) or an automated speech recognition server 513 that may receive voice interaction and process it to be used automatically (for example, so that a synthetic test voice call may respond appropriately to voice prompts in an IVR).

According to the embodiment, a call recording test engine 410 may operate in a variety of arrangements, such as connected 500 to a network 130 to test and record interactions outside of a contact center, or connected 620 to inbound communication channels as well as a contact center 150 for testing specific communication or interaction types, contact center operations, or for comparing test recording against a contact center's own recorded interactions (as described below, referring to FIG. 17).

Call recording may generally be considered to be either active or passive in nature, according to the manner in which testing takes place. In the more traditional passive approach, interactions are automatically recorded by a contact center's call recording system and the recordings stored for reference. Testing of the recordings generally comprises an examination of whether a recording exists or not to verify recording system function, but it does not consider the quality or content of the recording. For example, a recording may have been created and stored, but may be missing portions of a conversation or have technical issues such as missing audio tracks or file corruption. In passive recording, these issues may go unnoticed during testing, and a test will return a success simply because a recording file was found, even though it may be of no actual use. In active recording, a test call is placed and recorded specifically for testing purposes, and the resulting recording is then retrieved and examined for content and quality. Because a test call was created for this purpose, the recording's content and quality may be anticipated and compared against the actual results found in the recording file, highlighting technical issues and other problems that would be invisible to passive recording. The embodiments described herein comprise methods that may be implemented using active testing as well as a hybrid approach, utilizing active testing and comparing results with the passive testing provided by existing contact center systems, enabling not only the advanced testing offered by an active approach but also inherent auditing of the passive system through results comparison.

Figure 5:
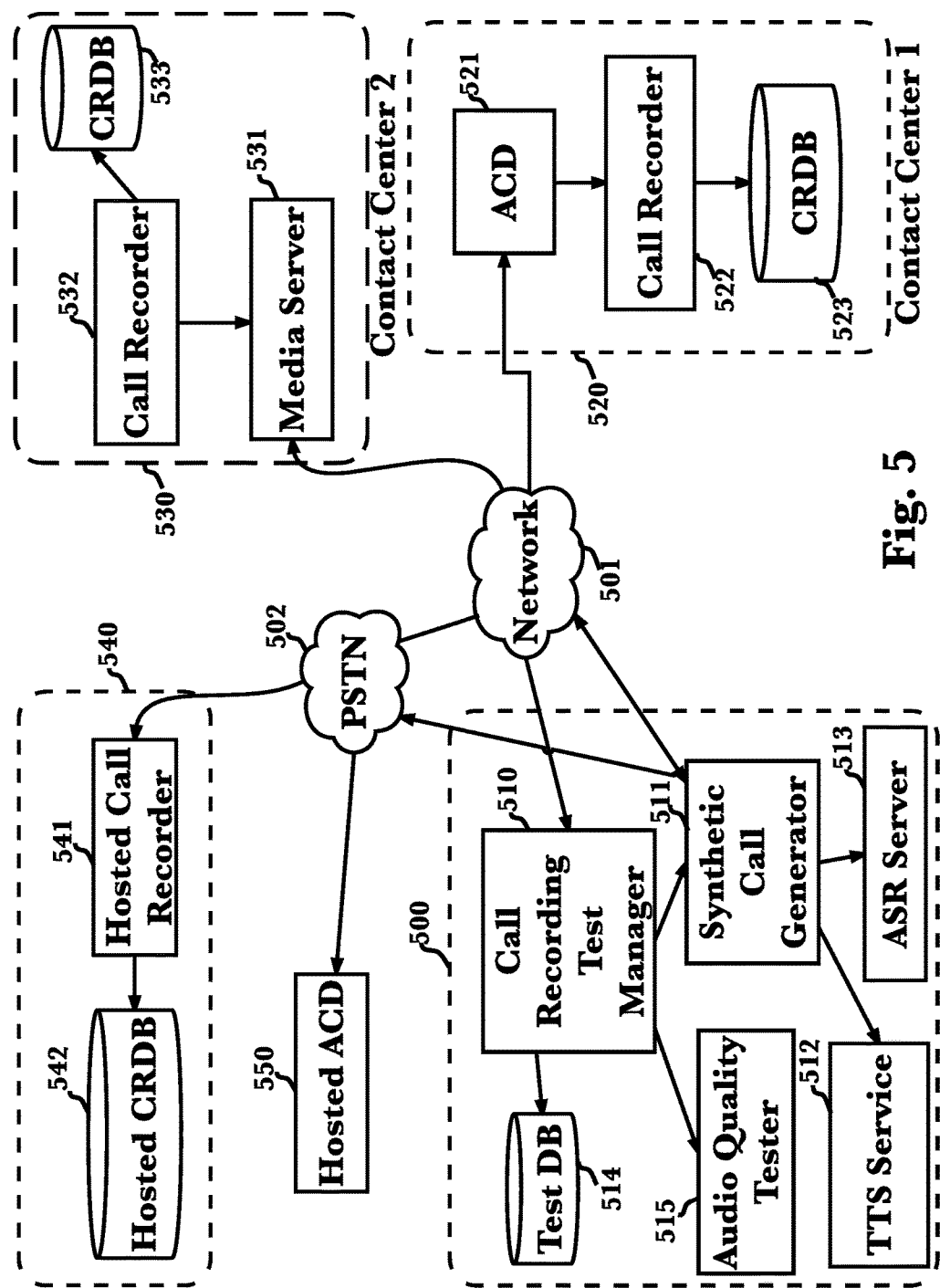
FIG. 5 is block diagram showing an exemplary system architecture for performing call recording testing, according to a preferred embodiment of the invention.

FIG. 5 is a block diagram illustrating an exemplary system architecture 500 for a call recording test engine, according to a preferred embodiment of the invention. According to the embodiment, a test engine 500 may comprise a call recording test manager 510 stored and operating on a network 501, such as to connect with various call recording systems known in the art that may be operated by network-connected client systems (such as contact centers 520 and 530), as illustrated. Such systems may include (but are not limited to) an automated call distributor incoming calls, and that may utilize a call recorder 522 to record calls for storage in a call recording database (CRDB) 523, or a media server 531 that may be operated by a contact center 530 and that may be used for such purposes as to receive various data communications such as e-mail, IP-based chat interactions, or other such interactions, and that may utilize a call recorder 532 for such purposes as to record a copy of received interactions for storage in a CRDB 533. It should be appreciated that the systems shown are exemplary, and that a variety of possible systems may be utilized according to the invention, such as alternate forms of call or media servers, for example alternate systems not illustrated such as an e-mail server, chat server, web server, or any other suitable interaction component that may receive user interactions for recording.

Further according to the embodiment, connections across networks may be possible such as from data communication network 501 such as the Internet, to a public switched telephone network (PSTN) 502, for example to interact with telephony-based systems such as a hosted ACD 550, as are commonly utilized in distributed or cloud-based contact center applications in the art, or a hosted call recorder 541 that may be operated by a call recording service 540 such as for providing call recording functionality in a cloud-based or software as a service (SaaS) arrangement to third parties, and that may record calls or interactions for storage in a hosted CRDB 542. In this manner, it can be appreciated that the call recording test manager 510 of the invention may be useful in a variety of local, remote, or cloud-based arrangements, without need for a particular system, arrangement, or network.

According to the embodiment, a call recording test engine 500 may further comprise additional systems for use with a call recording test manager 510, such as (as illustrated) a synthetic call generator 511 that may be a software or hardware component that may be utilized to place synthetic calls or interactions to connected call recording systems, which may be enabled through one or more pathways including mediated by the call recording test manager 510, through a data communication network 501 or directly through a PSTN 511 depending on the aspect in use, for example to test their functionality using specially-crafted interactions designed to examine specific functionalities or use cases. A synthetic call generator 511 may further utilize text-to-speech (TTS) service 512 for such purposes as to generate audible interaction prompts from text-based input, for example such that a configuration file in text form may be loaded and used to generate a synthetic text call, as well as an automated speech recognition (ASR) server 513 that may receive audible interaction and translate it into text-based output suitable for storage or computer-based interpretation. Such speech conversion functions may be used in the execution of test voice calls, which may then be executed as an audio interaction similar to a traditional telephone call for purposes of interaction with telephony-based systems such as an ACD 521. An audio quality tester 515 may also be utilized of the test engine 500 to cover not only testing the operation of a call recording system or whether a recording was made and can be retrieved, but also the quality and therefore usefulness of the recordings themselves. Additionally, a database 514 may be utilized by the test engine 500 such as to store the results of test operations or configuration files such as text-based calls scripts for use by a TTS service 512 as described previously.

It should be appreciated that a variety of additional or alternate systems or services may be utilized according to the invention, and as appropriate for a particular arrangement, and the specific systems and communication interactions illustrated are merely exemplary as a means of demonstrating the utility offered by the test engine 500 of the invention as described herein. For example, the test engine 500 of the invention may be utilized with a variety of call recording or interaction systems according to the specific arrangement of a contact center, for example interacting with contact center agents (either regular agents that take customer calls, or optionally a specific group that only interacts with the testing system to perform test operations), or with automated or semi-automated audio listeners or interactions systems, such that synthetic calls may be handled without occupying actual agents that may be better employed in taking live calls from customers. Additionally, interactions may occur entirely within software communication, for example via a software application programming interface (API) that may be operated by a contact center to enable integration of their call recording system with other services (in this case, the call recording test engine 500 of the invention), such that no actual calls occur and the software components may interact directly with each other to simulate what "would happen" if actual calls were used.

Figure 6:
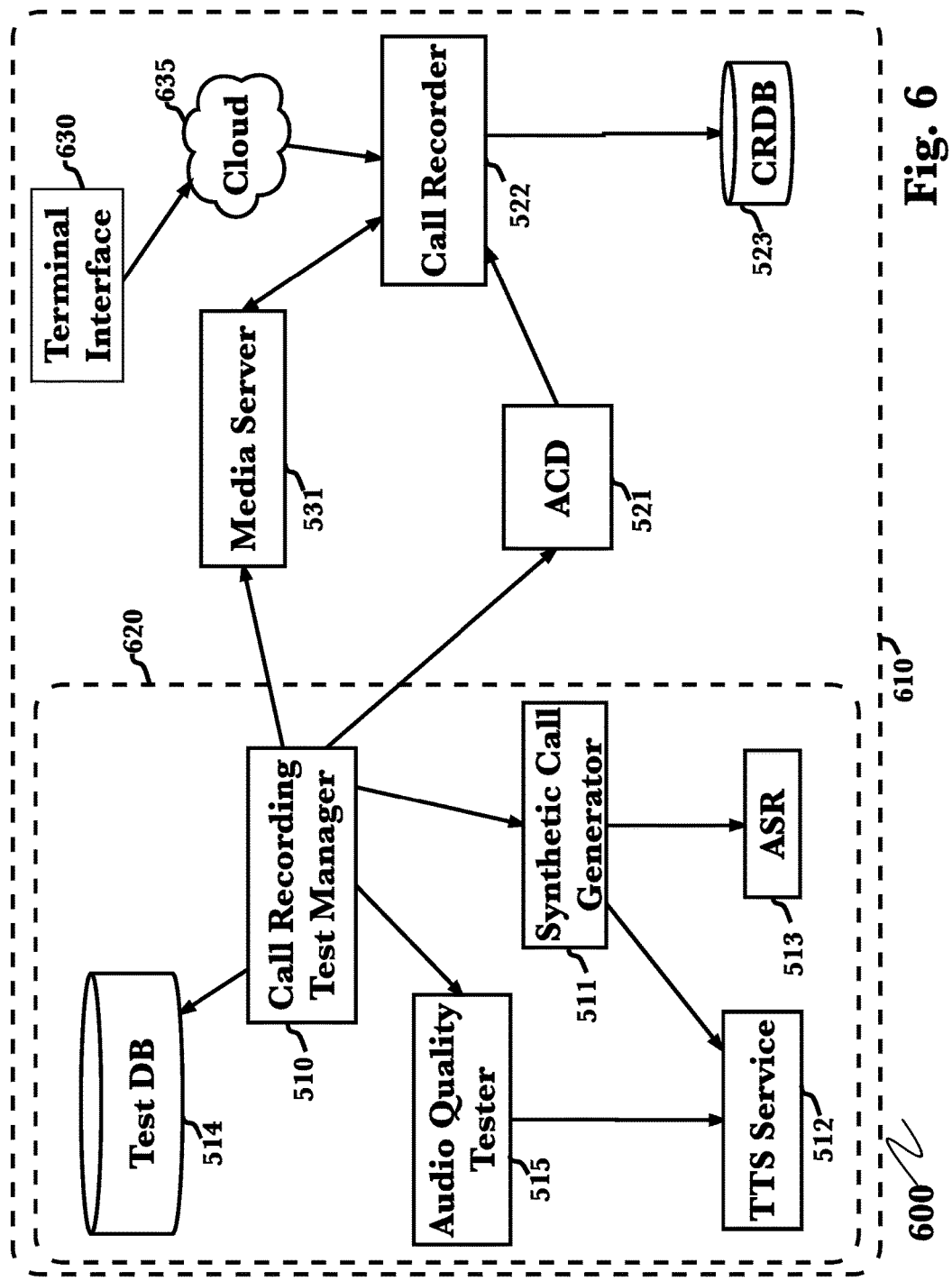
FIG. 6 is a block diagram illustrating an exemplary alternate arrangement of a system architecture for performing call recording testing, illustrating the use of an on-site test engine.

FIG. 6 is a block diagram illustrating an exemplary alternate arrangement of a system architecture 600 for performing call recording testing, illustrating the use of an on-site test engine 620 operating within a contact center 610. According to such an arrangement, a test engine 620 may comprise a call recording test manager 510 stored and operating on a computing device that may communicate with various call recording systems operated by a contact center 610. Such systems may include (but are not limited to) an automated call distributor (ACD) 521 operated by a contact center 520, that may generally receive and distribute incoming calls, and that may utilize a call recorder 522 to record calls for storage in a call recording database (CRDB) 523, or a media server 531 that may be operated by a contact center 610 and that may be used for such purposes as to receive various data communications such as e-mail, IP-based chat interactions, or other such interactions, and that may utilize a call recorder 532 for such purposes as to record a copy of received interactions for storage in a CRDB 523. It should be appreciated that the systems shown are exemplary, and that a variety of possible systems may be utilized according to the invention, such as alternate forms of call recorders 522, media servers 531, or portals for interaction with components during test set up such as terminal interfaces 630 which may be either local or network connected 635 to allow direct manipulation of specific data contained within one or more test components 522. For example, alternate systems not illustrated such as an e-mail server, chat server, web server, or any other suitable interaction component that may receive user interactions for recording.

According to the embodiment, a contact center 610 may operate a testing engine 620 on-site to monitor and test user interactions during regular operations, or to perform testing of stored or historical recordings in a CRDB 523, for example to audit a store of interaction recordings. For example, a contact center may temporarily implement testing to perform a one-time audit, or within a single contact center environment, without testing network-connected resources or systems as described previously (referring to FIG. 5), for example as may be useful for a small organization with only a single contact center that may wish to utilize a single testing engine on-site to defray additional costs associated with a network-based testing service or provider.

Detailed Description of Exemplary Embodiments

Figure 7:
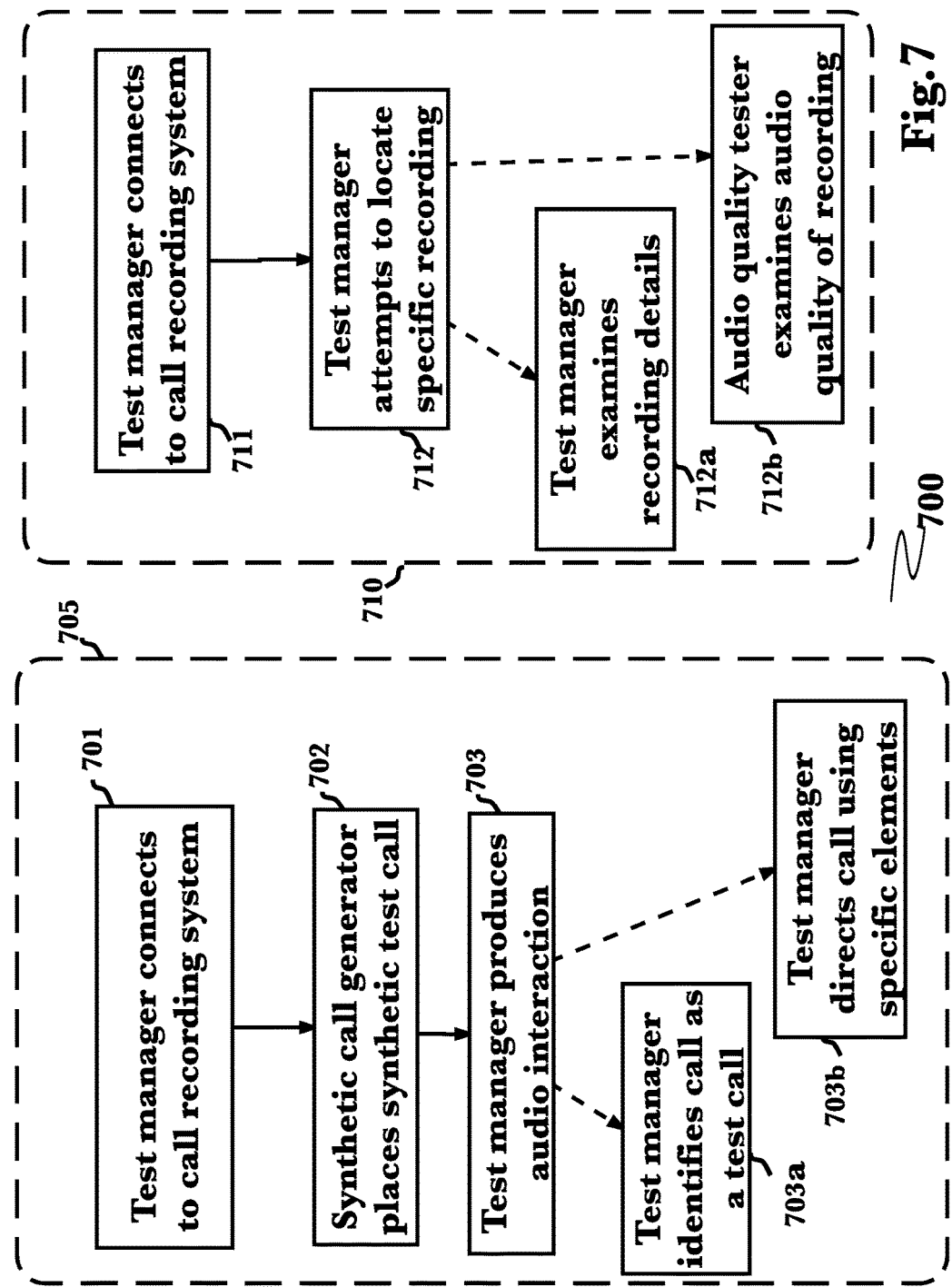
FIG. 7 is a method flow diagram illustrating an exemplary method for placing a synthetic test voice call, and an exemplary method for performing call recording testing for a specific call recording, according to a preferred embodiment of the invention.

FIG. 7 is a method flow diagram illustrating an exemplary method 700 for placing a synthetic test voice call 705, and an exemplary method 710 for performing call recording testing, according to a preferred embodiment of the invention. In an initial step 701, the test manager may connect via a network to a call recording system such as might be operated by a contact center (for example), for example by placing a telephone call to the contact center that the interaction may be handled as if it were a live interaction (such as with a customer calling in). In a next step 702, a synthetic call may be constructed by a synthetic call generator, optionally by loading a stored configuration from a database. In a next step 703, test manager may be used to produce audible interaction, for example to navigate an interactive voice response (IVR) system or to interact with a contact center agent. In an optional substep 703a, the test manager may identify the call as a synthetic test voice call, for example by notifying a contact center agent or automated call recording system that this call is being used for testing. In another optional substep 703b, the call recording test manager may direct the metadata of the call, for example by specifically inserting keywords or phrases, or by selecting specific topics or other inputs, in order to control the manner in which the call may be tagged or recorded. For example, in a test specifically examining the recording of customer account inquiries, the test manager may choose to specify various account-specific queries or keywords, in order to predictably influence the metadata that may be associated with the call recording.

According to a call recording test method 710, in an initial step 711 a call recording test manager may connect to a call recording system after a call (either real or synthetic) was placed and (presumably) recorded. At this point, according to the specific substeps that may have been utilized during a test voice call (if performed, as described previously), it may be known when the call was placed, what was "said" (that is, what specific synthetic call dialog was utilized), whether a transaction took place or was completed, and what metadata should be associated with the call. Therefore, in a next step 712, the test manager may query a recording system to attempt to locate the specific recording for the call, verifying whether a recording was taken and stored properly. In a next substep 712a, the call recording test manager may optionally examine the recording itself, such as to determine whether it is PCI-compliant (for example, if the call was regarding a financial transaction), or if it is properly tagged according to the metadata that may be expected. In a next optional substep 712b, the test manager may provide the recording to an audio quality tester, such as to analyze the recording and determine the quality of the recorded audio (for example, to ensure that it will be intelligible to a human analyst if necessary, or to ensure that specific details have been appropriately censored such as credit card or social security numbers), for example by comparing the received audio against a known transcript of a synthetic call and ensuring that the translation is consistent and key areas are censored as appropriate.

It should be appreciated that the method described herein may be applied also to testing recordings of live calls—that is, calls produced from actual interactions in a production setting. In this manner, by optionally employing the use of a synthetic call, specially-crafted test voice calls may be utilized to test specific functions or features, or by omitting the synthetic call steps it is also possible to test actual call to verify real-world operation, and it should be appreciated that such arrangements may be utilized interchangeably according to the embodiment. Additionally, it should be appreciated that the methods described herein may be employed while a call recording system is in operation, for example monitoring and testing call recordings as they take place, such as to monitor the performance of a call recording system in real-time.

Figure 8A:
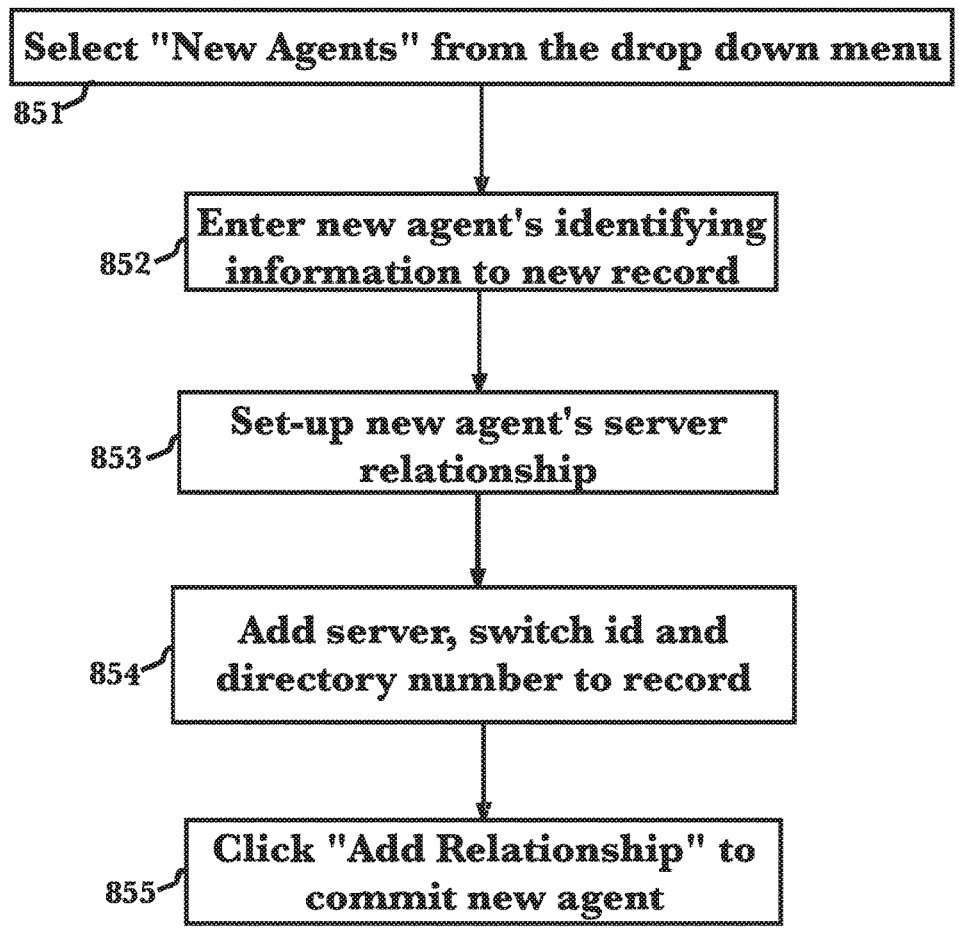
FIGS. 8A and 8B are method flow diagrams illustrating exemplary methods for call recording utilizing an agent environment, according to preferred embodiments of the invention.
Figure 8B:
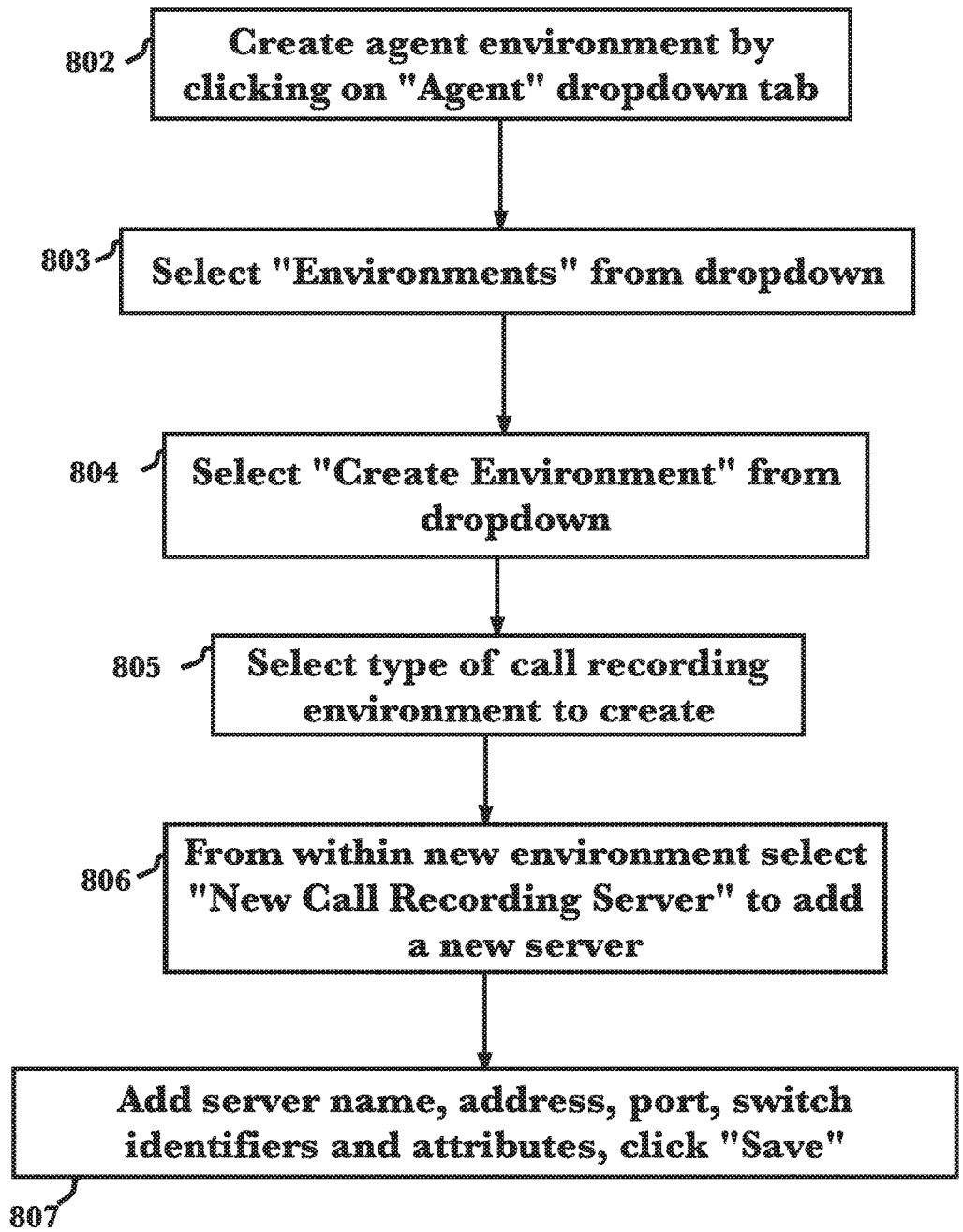

FIGS. 8A and 8B are method flow diagrams illustrating exemplary methods for call recording utilizing an agent environment, according to preferred embodiments of the invention.

FIG. 8a is an exemplary method flow diagram illustrating agent set up for the test engine according to an aspect of the invention 850. From a configuration screen, the choice "New Agent" is selected from a dropdown menu of possible configuration options 851. The action begins agent setup by interactively collecting the new agent's identifying information for eventual addition of that identifying information into a data record 852. Specific information pertaining to the relationship between the agent and the call system includes a server account 853, which is then added to the agent's data record along with other call system specific parameters such as but not limited to the agents switch id, the agent's directory number and other needed call system identifiers 854 familiar to those skilled in the art. The final step in new agent setup may be to commit the agent's information within the system by selecting an interface action token for example, an "Add Relationship" button 855.

FIG. 8B is an exemplary method flow diagram illustrating call recording using an agent environment according to a preferred embodiment 800. In an initial step 802, a test administrator who may be connected to a contact center's call recording system creates an agent environment by clicking on an "Agent" dropdown tab and selecting "Environments" from the subsequent dropdown list 803. In a next step 804, she selects "Create Environment" from a dropdown list and subsequently selects the type of call recording environment to create 805 to choose one of the possible environments available which will then present her with the option to designate a new call recording server once an environment is selected 806. In a next step 807 the test manager may set up call recording server by adding a server name, server address, and server port as well as switch identifiers and attributes for call recording; and save the configured call recording server by clicking the "Save Server" button.

Figure 9:
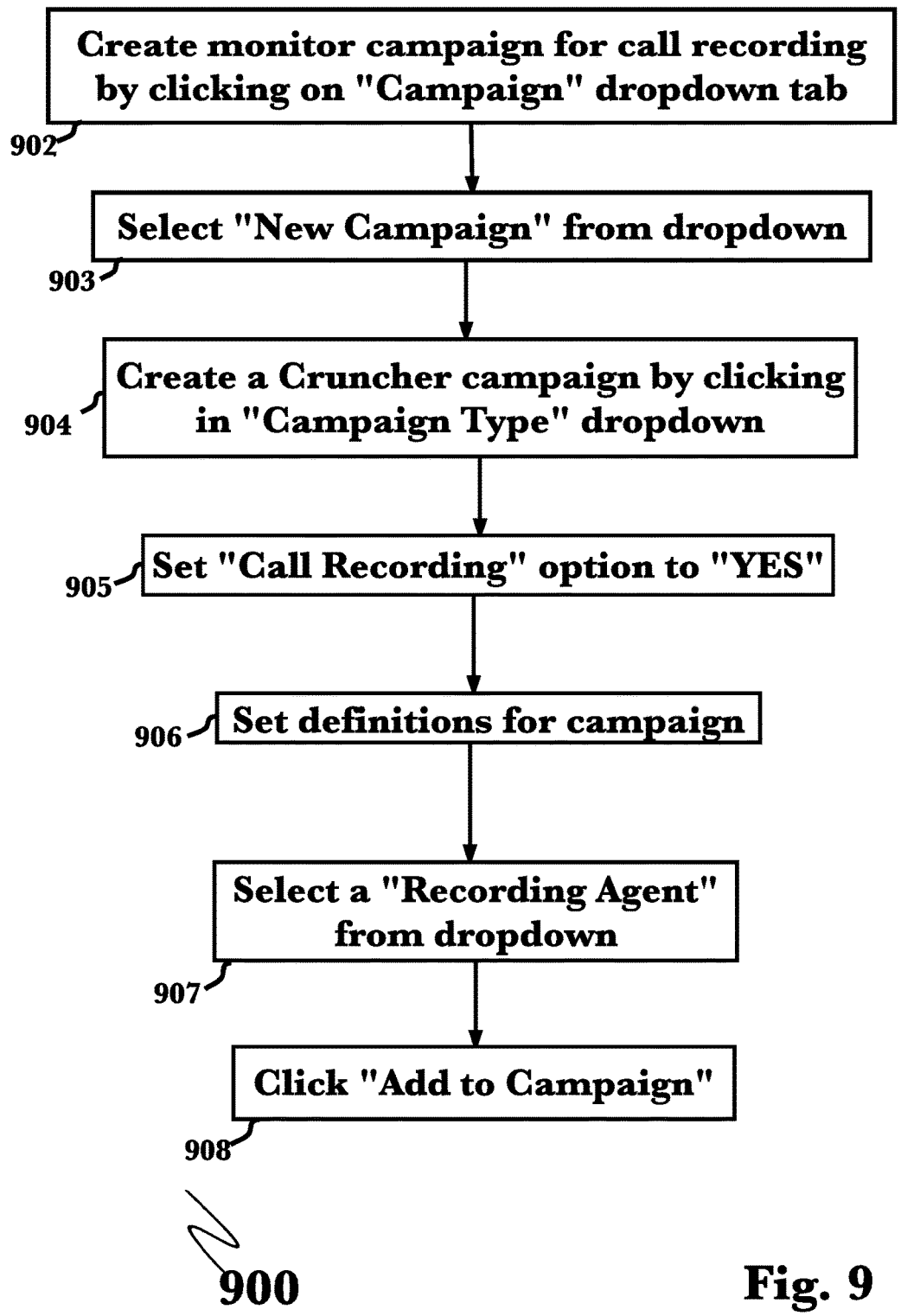
FIG. 9 is a method flow diagram illustrating, an exemplary method for monitoring call recording utilizing a cruncher campaign, according to a preferred embodiment of the invention.

FIG. 9 is a method flow diagram illustrating an exemplary method 900 for monitoring call recording utilizing a cruncher campaign, according to a preferred method of the invention. A call recording test manager may be connected to a call recording system while a call (either real or synthetic) is placed and (presumably) recorded; a monitor campaign can be created and run while a call is in progress. In a next step 902, a monitor campaign may be for call recording by clicking on "Campaign" dropdown tab in an administrative user interface for the monitor system and then selecting "New Campaign" 903 from subsequent dropdown list. The test manager may then select the type of campaign that is desired by choosing a type, for example "Cruncher campaign" from an interface presented "Campaign Type" dropdown menu 904. In a next step 905, a "Call Recording" option may be set to "YES" (leaving this option at "NO" will prevent recording from taking place during call and subsequent campaigns). In a next step 906, the test manager may set configuration definitions for campaign (such as but not limited to agent environment, recording agents available, the option to check recording calls, the option to save recordings, and so forth). Another step 907 may be to select a "Recording Agent" to whom to attach the recording from a dropdown. In a final step 908, clicking an "Add to Campaign" button and a cruncher campaign will be set up and run during a live call.

Figure 10:
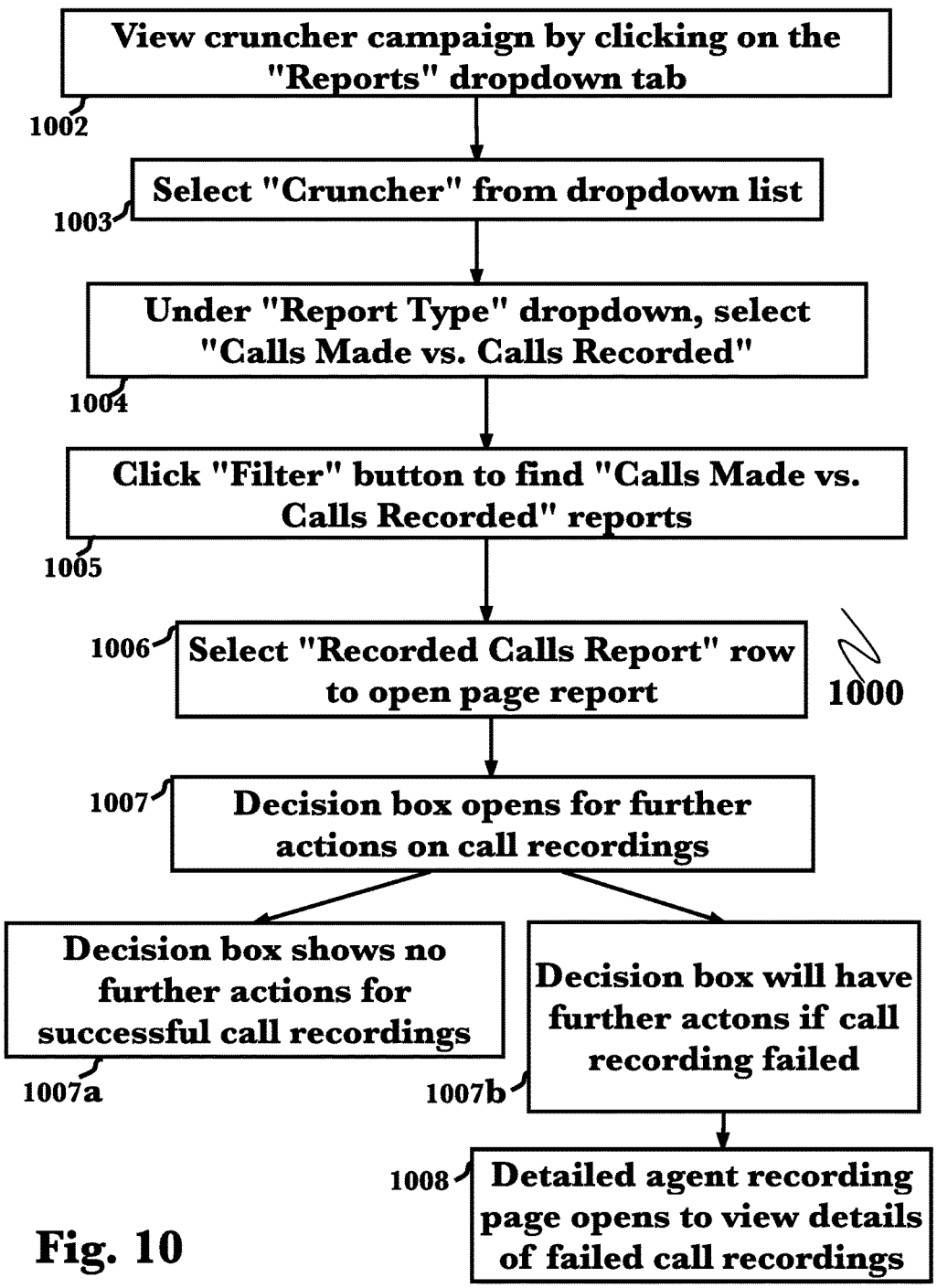
FIG. 10 is another method flow diagram illustrating, an exemplary method for viewing call recording utilizing a campaign, according to a preferred embodiment of the invention.

FIG. 10 is another method flow illustrating, an exemplary method 1000 for viewing call recording utilizing a campaign, according to a preferred embodiment of the invention. At the start, the test manager may be connected via a network to a call recording platform such as might be operated by a contact center (for example) to view results of a campaign to check if call recording has taken place. In a next step 1002, she may view a separate cruncher campaign that ran concurrently to the test voice call to place significant added stress on recording and storage functions during a call recording (either a test voice call that was real or synthetic, or a live call) by clicking on "Reports" dropdown tab, in a subsequent step 1003, selecting "Cruncher" from the subsequent dropdown list. In a next step 1004, under a "Report Type" dropdown list, "Calls Made v. Calls Recorded" may be chosen and in a subsequent next step 1005 the test manager may click on a "Filter" button to find reports for "Calls Made v. Calls Recorded." In a next step 1006, selecting a "Recorded Calls Report" row to open the desired report. A decision box 1007 opens for further actions on call recordings; decision box 1007a will show no further action is necessary if call was recorded successfully, subsequently if call recording failed, decision box 1007b will have actions to choose failed recording opening a detailed agent recording page 1008.

Figure 11:
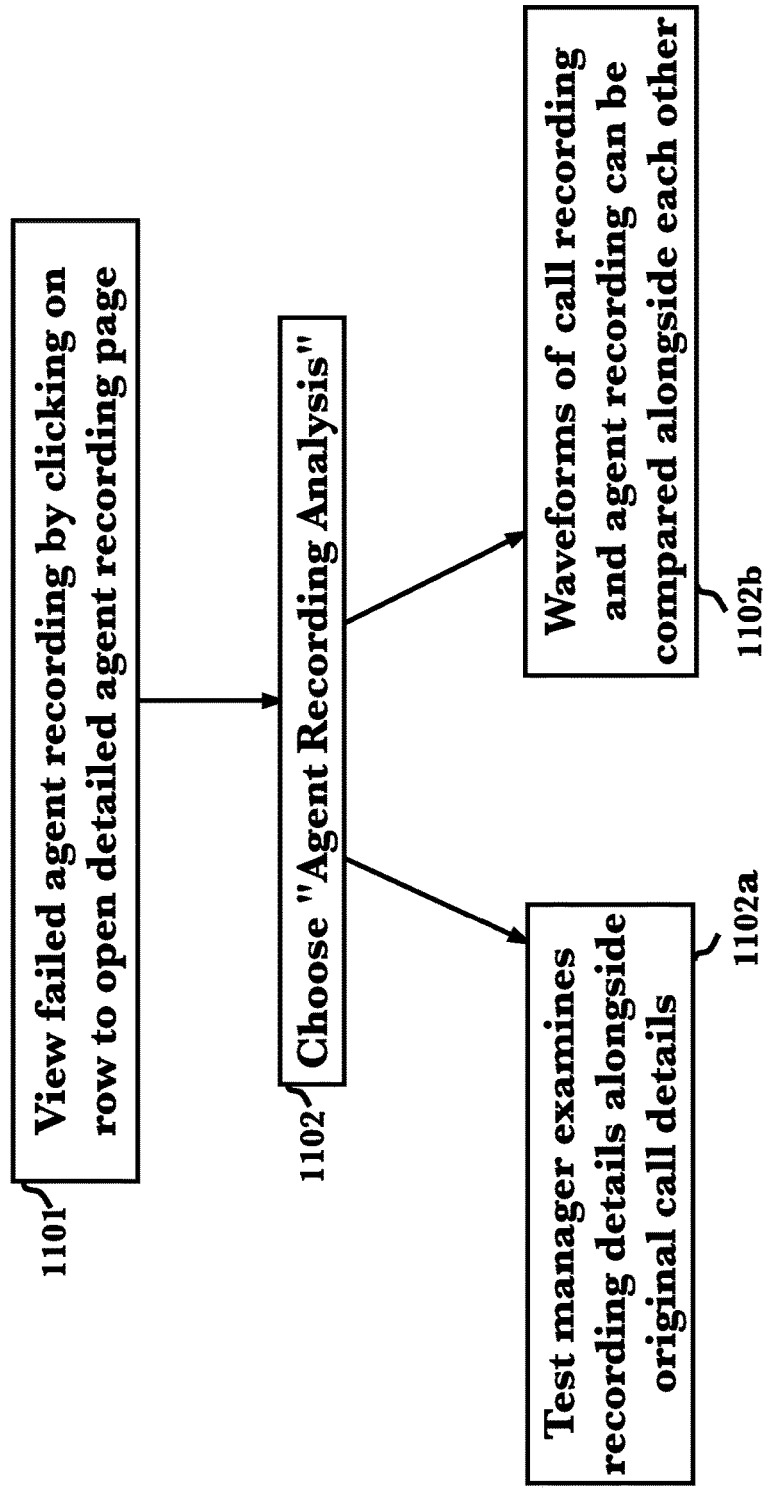
FIG. 11 is another method flow diagram illustrating, an exemplary method for analyzing call recording, according to a preferred embodiment of the invention.

FIG. 11 is another method flow diagram illustrating an exemplary method 1100 for analyzing call recording, according to a preferred method of the invention. In an initial step 1101 an audio quality tester or test manager may view a failed agent recording by clicking on row of failed call recording to open a detailed agent recording page that may be done by clicking on an "Agent recording Analysis" button within the test platform's administrative user interface 1102 to access call recordings for viewing and analysis. One view choice 1102a, shows recording details alongside original call details; another view choice 1102b, allows the waveforms of a call recording can be compared to and alongside of waveforms of the agent recording. The display of these choices may be toggled so that both may be analyzed as needed.

Figure 12:
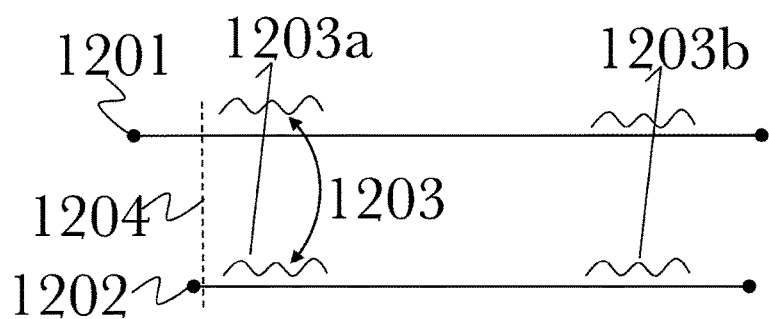
FIG. 12 is an illustration of an exemplary analysis of a call recording, according to a preferred embodiment of the invention.

FIG. 12 is an illustration of an exemplary analysis 1200 of a call recording, according to a preferred embodiment of the invention. Analysis of call recording can be done by comparing call recording 1201 and agent recording 1202 waveforms alongside one another. Analysis compares the two calls by matching tones 1203 that begin and end at the same point in both the full call recording 1201 and the agent call recording 1202. "Begin" tone 1203a starts after call has been transferred to agent 1204 for recording. "End" tone 1203b starts when call is ended; analysis places both call recordings alongside the other to allow an audio analyst to compare "begin" and "end" tones for matching in the same location at the same time for each call.

FIG. 17 is an illustration of two call recording audio waveforms 1700a-b, illustrating recording comparison and matching using audio fingerprinting techniques such as fast Fourier transform (FFT) algorithm processing to align two recordings 1700a-b and identify call segments 1710a-d within a recording 1700b. According to the embodiment, a contact center recording 1700a may be retrieved by a call recording test engine 620 for comparison against a recording 1700b collected by the test engine 620. The recordings may then be compared using audio fingerprinting, enabling the audio of one recording 1700a to be aligned 1711 with a portion of a larger recording 1700b that was collected by listening to an interaction bother before and after the contact center's internal testing system began recording. Additionally, audio fingerprinting may be used to identify portions of an interaction based on the audio content that was collected, for example to identify when a telephone call was dialing 1710a, ringing 1710b, answered 1710c (which is generally when a contact center's internal recording takes place, as shown), and potentially collecting additional audio 1710d that may be part of a call that was missed by an internal recording 1700a, for example if a recording ends prematurely and portions of a conversation are missed. These recordings 1700b may therefore include additional data that is not stored in traditional recordings 1700a, and analysis may reveal additional information such as voice analysis to identify portions of conversation such as keywords or phrases, or to track conversation-specific metrics that cannot be tracked traditionally. For example, internal recordings 1700a generally focus on the presence of a recording, without concern for the content. By storing and analyzing an entire interaction recording 1700b, new analysis and tracking is possible such as ensuring that contact center agents use preferred vocabulary when interacting with customers, or to ensure that customers are able to hear IVR prompts appropriately, or other such detailed information that may only be observed through recording and analyzing the audio content of an interaction. These interaction recordings may then be encrypted and stored for future reference, as described above (with reference to FIG. 4).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 13:
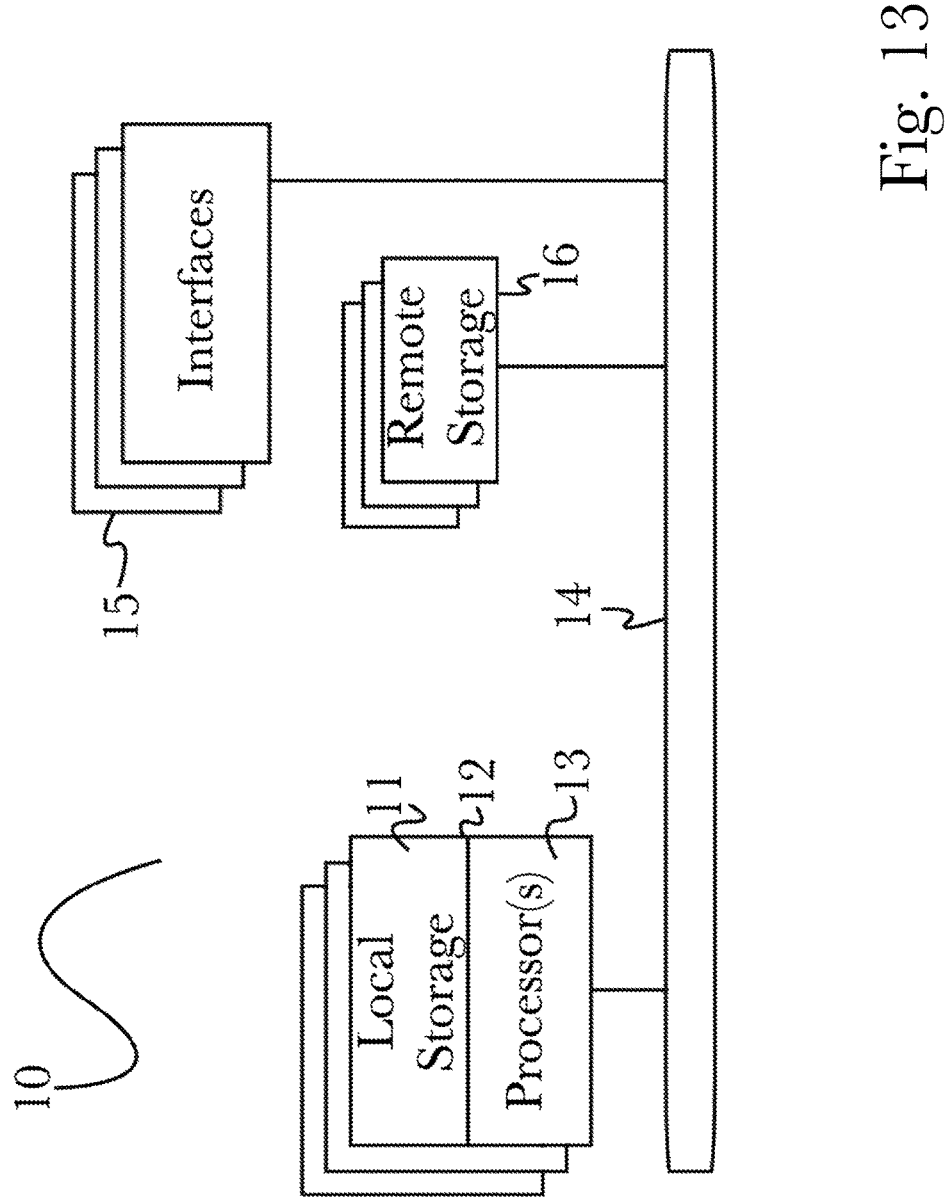
FIG. 13 is a block diagram illustrating an exemplary hardware architecture of a computing device used in an embodiment of the invention.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
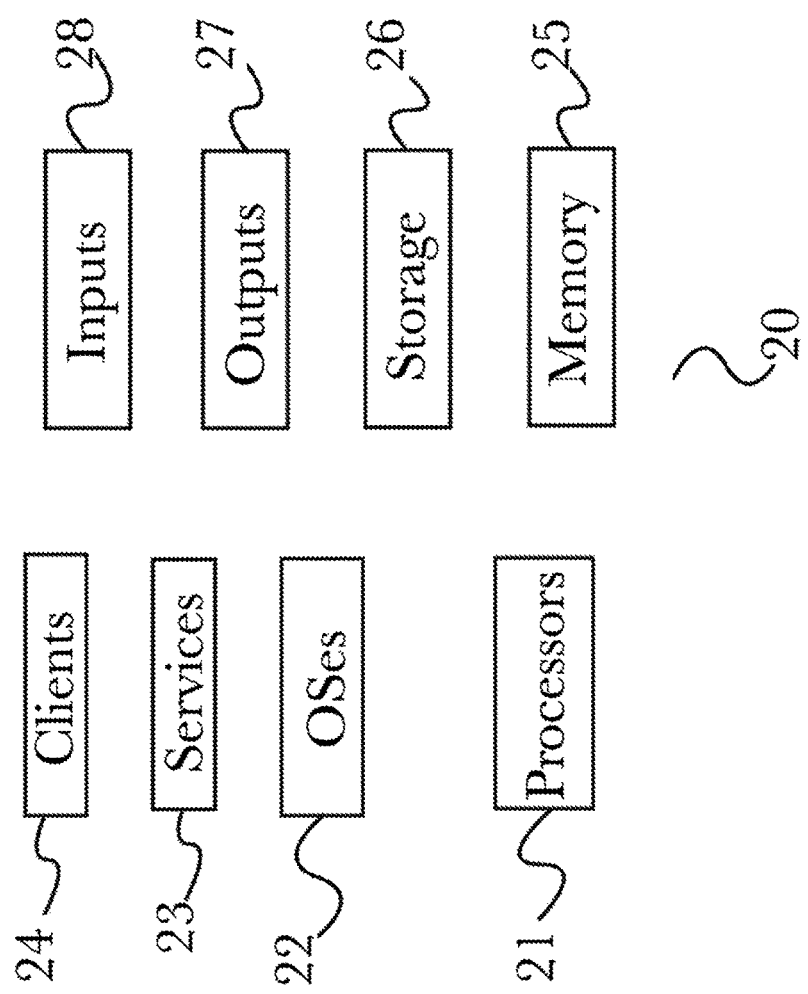
FIG. 14 is a block diagram illustrating an exemplary logical architecture for a client device, according to an embodiment of the invention.

In some embodiments, systems according to the present invention may be implemented on a standalone computing system. Referring now to FIG. 14, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
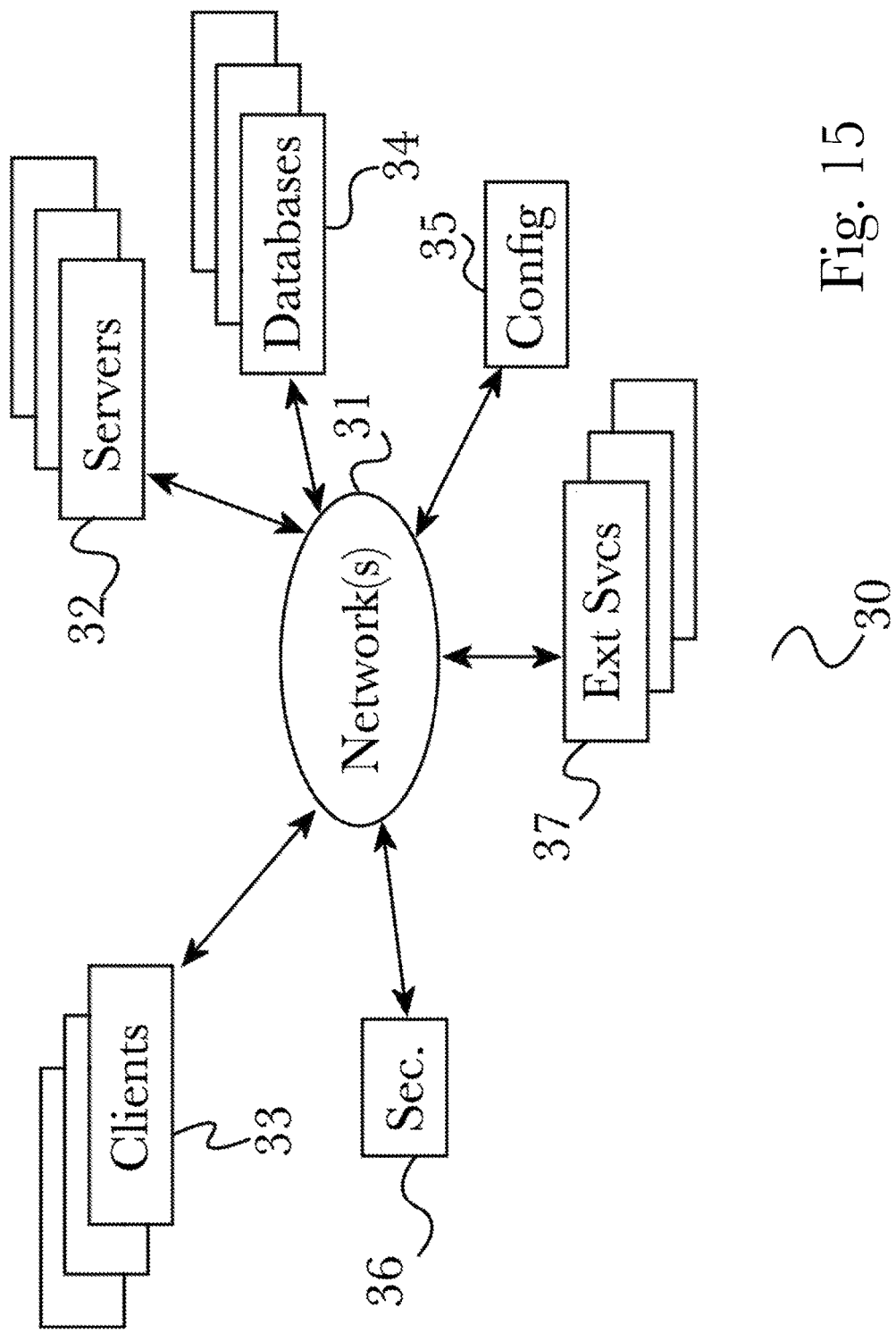
FIG. 15 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 15, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 16:
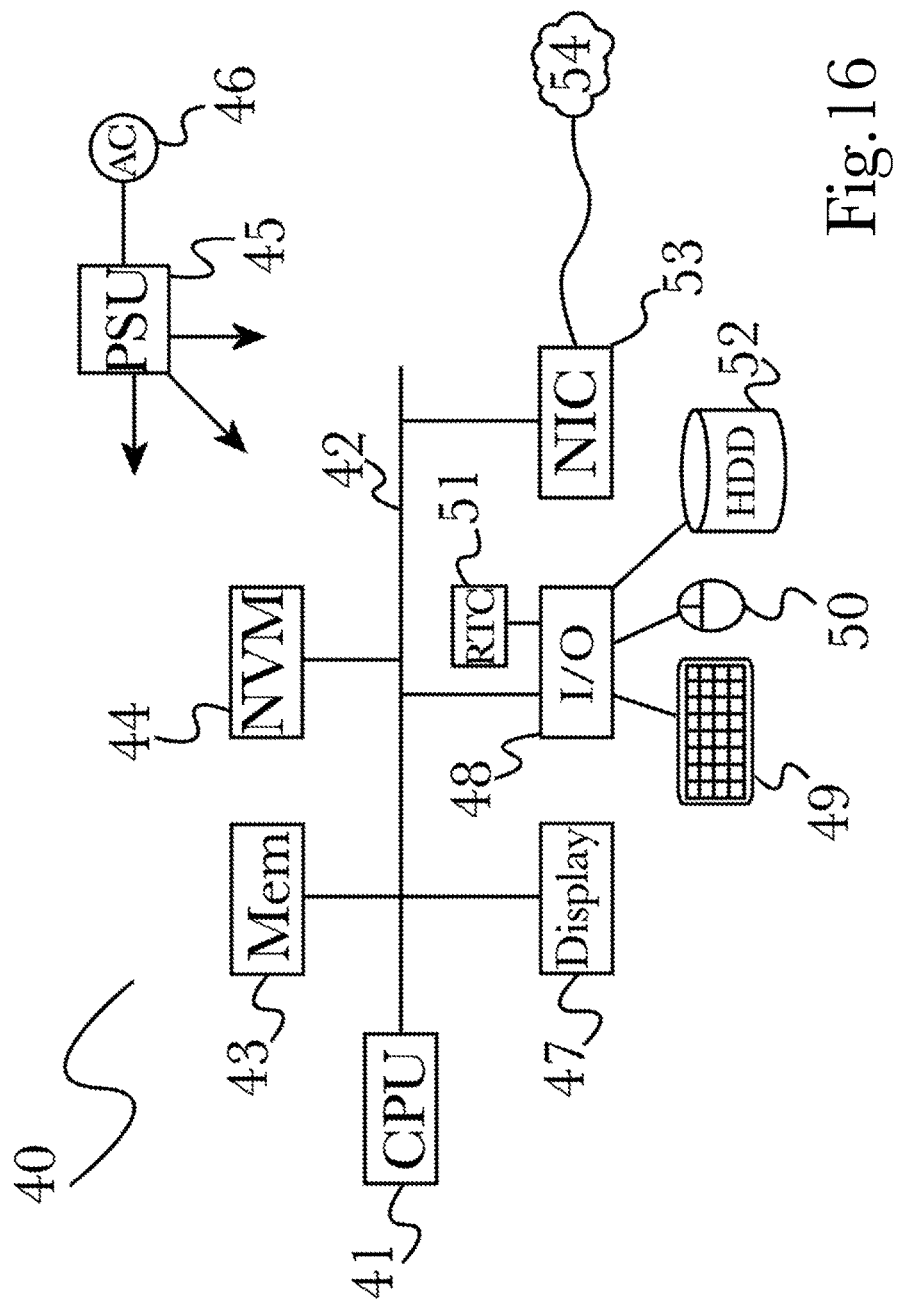
FIG. 16 is another block diagram illustrating an exemplary hardware architecture of a computing device used in various embodiments of the invention.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A call recording test engine, comprising:
a test database configured to store and provide testing information, the testing information comprising at least a test configuration;
a synthetic call generator configured to produce test voice calls into a contact center, the test voice calls being based at least in part on test information retrieved from the test database and comprising at least audio-based voice interaction; and
a test manager configured to retrieve testing information from the test database, direct an operation of the synthetic call generator, record a test voice call, connect to a call recording system operated by a contact center, retrieve a recording of a complete call from connection to termination from the call recording system, and analyze the retrieved recording based at least in part on the testing information, the analysis comprising at least a comparison between the recorded test voice call and the retrieved call recording.

2. The system of claim 1, wherein the analysis comprises at least a plurality of audio fingerprinting techniques.

3. The system of claim 1, wherein the analysis comprises at least a fast Fourier transform algorithmic analysis.

* * * * *